(12) United States Patent
Marks

(10) Patent No.: US 9,893,605 B2
(45) Date of Patent: Feb. 13, 2018

(54) METHOD AND DEVICE FOR INTRINSICALLY SAFE REDUNDANT CURRENT SUPPLY OF FIELD DEVICES

(71) Applicant: ABB Schweiz AG, Baden (CH)

(72) Inventor: Frank Marks, Langenfeld (DE)

(73) Assignee: ABB SCHWEIZ AG, Baden (CH)

( * ) Notice: Subject to any disclaimer, the term of this patent is extended or adjusted under 35 U.S.C. 154(b) by 160 days.

(21) Appl. No.: 14/813,156

(22) Filed: Jul. 30, 2015

(65) Prior Publication Data
US 2017/0149324 A1  May 25, 2017

(30) Foreign Application Priority Data
Aug. 6, 2014  (DE) .................. 10 2014 011 717

(51) Int. Cl.
| H02J 1/00 | (2006.01) |
|---|---|
| H02J 3/00 | (2006.01) |
| H02M 1/32 | (2007.01) |
| H02H 9/00 | (2006.01) |

(52) U.S. Cl.
CPC .............. H02M 1/32 (2013.01); H02H 9/008 (2013.01)

(58) Field of Classification Search
CPC ................................ H02H 9/008; H02M 1/32
See application file for complete search history.

(56) References Cited

U.S. PATENT DOCUMENTS

| 3,504,233 | A | * | 3/1970 | Hurtle | .................... | H01H 9/542 |
|---|---|---|---|---|---|---|
| | | | | | | 361/13 |
| 4,638,396 | A | * | 1/1987 | Mukli | .................... | H02H 9/008 |
| | | | | | | 361/101 |
| 5,347,841 | A | * | 9/1994 | Enzinna | .................. | G01P 21/00 |
| | | | | | | 73/1.88 |
| 5,694,283 | A | * | 12/1997 | Huczko | .................. | H02H 9/008 |
| | | | | | | 361/115 |
| 6,967,486 | B2 | * | 11/2005 | Schneider | .............. | G08C 19/02 |
| | | | | | | 324/500 |
| 7,091,631 | B2 | | 8/2006 | Junker | | |
| 7,358,744 | B2 | | 4/2008 | Scholz | | |
| 2013/0106358 | A1 | * | 5/2013 | Allgaier | .................. | H02J 7/007 |
| | | | | | | 320/128 |
| 2014/0347033 | A1 | * | 11/2014 | Dymek | .............. | G01R 19/0092 |
| | | | | | | 324/76.11 |
| 2015/0146332 | A1 | * | 5/2015 | Seberger | .................. | H02H 9/02 |
| | | | | | | 361/57 |

(Continued)

FOREIGN PATENT DOCUMENTS

| DE | 9421001 U1 | 2/1995 |
|---|---|---|
| DE | 19814097 C1 | 3/2000 |

(Continued)

*Primary Examiner* — Jared Fureman
*Assistant Examiner* — Esayas Yeshaw
(74) *Attorney, Agent, or Firm* — Leydig, Voit & Mayer, Ltd.

(57) ABSTRACT

A method and a device provide intrinsically safe redundant current supply of field devices with a common current-limiting resistor in the mesh of the field device, wherein the field device is connected via a connection line to field-device connection terminals of the current supply device consisting of at least two current supply units. The output voltage and/or the output current of each current supply unit is reduced as a function of the voltage across the field-device connection terminals.

4 Claims, 1 Drawing Sheet

(56) References Cited

U.S. PATENT DOCUMENTS

2016/0043561 A1* 2/2016 Marks .................. H02H 9/008
307/62

FOREIGN PATENT DOCUMENTS

| DE | 10135980 C1 | 4/2003 |
| DE | 10152653 A1 | 4/2003 |
| DE | 102005047894 B4 | 4/2007 |

* cited by examiner

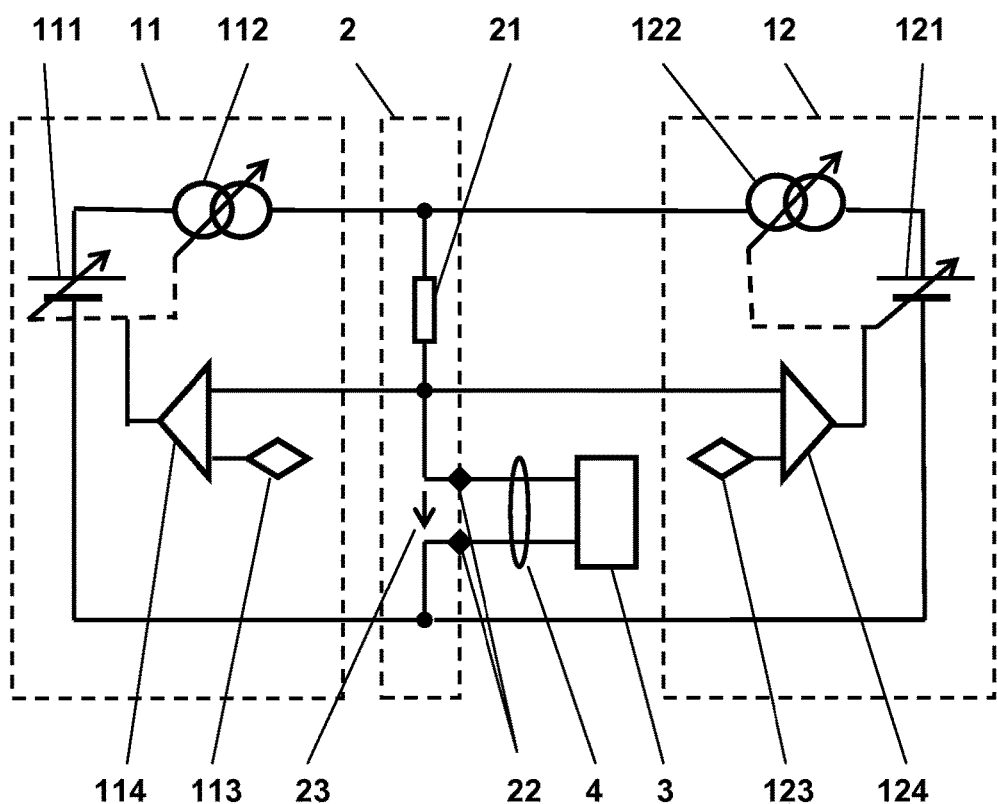

METHOD AND DEVICE FOR INTRINSICALLY SAFE REDUNDANT CURRENT SUPPLY OF FIELD DEVICES

CROSS-REFERENCE TO RELATED APPLICATIONS

Priority is claimed to German Patent Application No. DE 10 2014 011 717.0, filed on Aug. 6, 2014, the entire disclosure of which is hereby incorporated by reference herein.

FIELD

The invention relates to the intrinsically safe redundant current supply of field devices in automation engineering in an explosion-protected area.

BACKGROUND

A generic device has at least two supply circuits for providing the power/voltage supply and a protective device for intrinsically safe power limiting of the current supplied by the supply circuits to the consumer in the explosion-protected area, wherein the supply circuits as part of the protective device each have devices for controlling and/or limiting current.

Such devices are known and are used in installations in which parts of the operating means are operated in the explosion-protected area. The supply devices may be integrated in input/output components and are considered to be a link between an external arithmetic unit of a programmable logic controller and sensors and/or actuators in the explosion-protected area.

Operating means in plant sections which have been declared to be explosion-protected areas must meet particular requirements which are set out in European Standard EN 500 20. One option mentioned in EN 500 20 for operating means in the area at risk of explosion is so-called "intrinsic safety". In this connection, the supplied energy is limited such that no incentive spark can occur. In order to limit the energy, both current and power must be limited. The options for realizing this specifically are likewise regulated by EN 500 20.

In relation to the area at risk of explosion, differentiation into so-called zones is usual in Europe. In this case, a distinction is made between zone 0, zone 1 and zone 2, wherein the most stringent requirements exist for zone 0 since a permanently explosive atmosphere is assumed in this case. In this area, only resistive limiting of the current is permitted. Therefore, only resistors are allowed but no electronic limiters for the current. That is to say that, in the case of an input/output component in which a current is intended to be conducted in the explosion-protected area in zone 0, said current must be limited by one or more resistors, wherein the resistor or resistors must likewise meet particular preconditions.

The functionality or availability of input/output components can also significantly increase in the explosion-protected area if said input/output components are redundantly supplied. That is to say the circuit in the explosion-protected area (zone 0, 1 or 2), which is also referred to as field circuit, is connected to at least two supply circuits having the same function, wherein one supply circuit is active and the other supply circuit is on standby. If a fault occurs in the active device, it is possible to automatically change over to the second device without significant disturbances occurring in the process.

Additionally, in the case of a redundant supply such as this of input/output components in the explosion-protected area, the respective safety requirements must, of course, be met, for example the safety level of the "intrinsic safety". The intrinsic safety can be maintained, for example, by a changeover being effected between the two supply circuits such that in each case only one supply circuit is connected to the explosion-protected area. In order that an erroneous parallel connection of the two supply circuits, in the case of which the "intrinsic safety" would no longer be ensured owing to the addition of the currents of the two modules, does not occur there is a safety requirement on the changeover device used in the case of this implementation.

As a result of this, additional components are required, which is associated with an increase in complexity in terms of construction and an increase in costs. The device for redundant power/voltage supply itself can be configured such that it may be used at least in zone 1 or zone 2.

A connection unit for electrically coupling redundant assemblies to external communications interfaces is known from German utility model DE 94 21 001 U1, which external communications interfaces consist of parallel-connected plug-on-type units which are designed to receive current-limiting switching means.

Furthermore, an arrangement for connecting field devices arranged decentrally and in the immediate vicinity of the process to a remote central device is known from DE 101 35 980 C1, which central device has a plug unit that determines the configuration and is suitable for redundant connection of input/output assemblies and can have a current-limiting resistor in the event of a parallel connection.

What is common to the two known devices is that, although the common current-limiting resistor limits the current in the field circuit to permissible values in the event of a redundant connection of input/output assemblies, in the event of a failure of one of the redundant assemblies the required supply current strength for operating the connected field device is no longer provided for all application cases, however.

Moreover, an arrangement for redundant voltage supply of two-wire measuring transducers is known from DE 198 14 097 C1, in the case of which the redundant measuring transducer supply units are decoupled from one another by means of diodes and in each case only one measuring transducer supply unit supplies the two-wire measuring transducer while the respective other measuring transducer supply unit is operated in a function monitoring mode. What is disadvantageous is the necessary changeover procedure, in the event of failure of the supplying measuring transducer supply unit, to the redundant measuring transducer supply unit.

Finally, in the case of redundant supply of the connected field device via a common singular current-limiting resistor, it should be noted that the loop current in the supply circuit, even in the case of redundant current supply, is to be limited to permissible values and that the power loss via the singular current-limiting resistor in the redundant current supply device in the permissible short-circuit case in the field-device-side conductor loop leads to an impermissible overloading of the resistive current limiter in the current supply device.

SUMMARY

An aspect of the invention provides a method for intrinsically safe redundant current supply of a field device including a common current-limiting resistor in a mesh of the field device, the method comprising: connecting the field device via a connection line to one or more field-device connection terminals of a current supply device including at least two current supply units; measuring a voltage across field-device connection terminals, to obtain a measured voltage; comparing the measured voltage with a reference value; and reducing an output voltage, an output current, or the output voltage and output current of each current supply unit as a function of the measured voltage if the measured voltage falls below the reference value.

BRIEF DESCRIPTION OF THE DRAWING

The present invention will be described in even greater detail below based on the exemplary FIGURE. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawing which illustrates the following:

FIG. 1 shows a device for intrinsically safe redundant current supply of field devices.

DETAILED DESCRIPTION

An aspect of the invention provides a protective circuit arrangement for redundantly supplied field devices, which arrangement protects itself from overloading.

An aspect of the invention proceeds from a device for intrinsically safe redundant current supply of field devices with a common current-limiting resistor in the mesh of the field device, wherein the field device is connected via a connection line to field-device connection terminals of the current supply device.

An aspect of the invention also proceeds from the fact that a minimum voltage is necessary for the intended operation of the field device.

According to an aspect of the invention, provision is made to measure the voltage across the field-device connection terminals, to compare said voltage with a reference value and the output voltage and/or the output current of each current supply unit is reduced as a function of the voltage across the field-device connection terminals if the voltage across the field-device connection terminals falls below the reference value.

In embodiments of the device, each current supply unit has power-limiting means which are adjusted using a measuring amplifier as a function of the difference between the voltage across the field-device connection terminals and a reference.

The power-limiting units are formed by a controllable voltage source and/or a current controller/an active current limiter.

In principle, three operating states of the current supply device can be differentiated.

In a first operating state, no field device is connected to the field-device connection terminals; the current supply device is in no-load operation. The voltage across the field-device connection terminals is approximately equal to the supply voltage of the current supply units. No loop current flows; the power at the field-device connection is zero.

In a second operating state, a field device is connected and operated as intended. The voltage across the field-device connection terminals is approximately the difference between supply voltage and voltage drop across the current-limiting resistor. The measured voltage across the field-device connection terminals is in any case greater than the required minimum voltage.

In a third operating state, there is an error which may be caused by a shunt-circuit, a short-circuit, a fault in the field device or the like. In this operating state, the voltage across the field-device connection terminals has fallen below the required minimum voltage for intended operation of the field device. When said minimum voltage is undershot, there is in any case an error present. Whether the minimum voltage has been undershot is identified by comparison with the reference value.

In response to said undershooting, the output current of the current supply units is reduced in a first manifestation of the invention. In a second manifestation of the invention, the supply voltage of the current supply units is reduced and, in a third manifestation, both the supply voltage and the output current of the current supply units are reduced.

In each manifestation, the power made available to the field-device connection terminals is reduced. Furthermore, the power at the current-limiting resistor is reduced. In this way, the current-limiting resistor is also protected from overloading.

When the supply voltage is reduced, the current-reducing switch elements of the current supply units are also protected from thermal overloading.

In this case, the power loss is divided among the current-limiting resistor, the controllable voltage source and the devices for controlling current or active current limiting in the two redundant current supply units. Accordingly, a design which can be housed in a miniaturized housing is permissible for the current-limiting resistor.

The invention is explained in more detail below on the basis of an exemplary embodiment. The single FIGURE illustrates a device for intrinsically safe redundant current supply of field devices 3 which consists of at least two identical current supply units 11 and 12 and a connection circuit 2.

Each current supply unit 11 and 12 has a controllable voltage source 111 and 121 and a current controller/an active current limiter 112 and 122. The current supply units 11 and 12 are connected on the output side to the connection circuit 2 and are electrically connected in parallel.

The connection circuit 2 has the current-limiting resistor 21 and field-device connection terminals 22 for the connection of a field device 3 via a connection line 4. A voltage 23 drops across the field-device connection terminals 22 of the connection circuit 2, which voltage represents the operating voltage of the field device 3.

Each current supply unit 11 and 12 has a measuring amplifier 114, 124, in which the measured value of the voltage 23 is compared with a reference value 113, 123. As soon as the voltage 23 is lower than the reference value 113, 123, the output current of the respective current supply unit 11 and 12 and hence the loop current is reduced by the current controller/the active current limiter 112 and 122.

Furthermore, the voltage of the controllable voltage source 111 and 121 is reduced. As a result of the reduced voltage of the controllable voltage source 111 and 121, the voltage drop across the current controller/the active current limiter 112 and 122 and the current-limiting resistor 21 falls. In the case of identical current, the power loss at said switch elements is correspondingly reduced.

In an advantageous configuration of the invention, the voltage of the controllable voltage source 111 and 121 is set in the event of a fault to a value above the minimum voltage for intended operation of the field device 3. Thus, in the event of a temporary disturbance in the field circuit 3, 4, automatic restarting of the field device 3 is ensured.

In another configuration of the invention, the voltage of the controllable voltage source 111 and 121 is suddenly reduced in the event of a fault and increased gradually once the fault has been eliminated.

In another configuration of the invention, provision is made for the output current of each current supply unit 11, 12 to be reduced as a function of the voltage 23 across the field-device connection terminals 22 to a test current which is lower than the supply current of the field device 3. In particular, in the case of a field device 3 which is designed as two-wire measuring transducer and is supplied via a 4-20 mA current loop and communicates with a superordinate device, 4 mA are provided for the supply of the measuring transducer and 16 mA are provided for the bandwidth of the measured value transmission. The proposed test current is greater than the current required for supplying the measuring transducer, for example >4 mA, but less than the permissible loop current, for example <20 mA. Advantageously, the test current is approximately one fifth of the permissible loop current. Accordingly, the power loss occurring at the current-limiting resistor 21 is reduced to approximately 4% compared to the power loss when limiting to the permissible loop current. The power loss occurring at the current controller/the active current limiter 112 and 122 falls proportionally.

In an advantageous configuration of the invention, the connection circuit 2 is designed as configuration-determining plug unit according to DE 101 35 980 C1, which allows both singular and redundant supply of the same field device 3.

Particularly advantageously, the proposed device for intrinsically safe redundant current supply is combined with field devices as described in DE 10 2005 047 894 B4. In this case, provision is made to increase the DC loop current independently of the measured values proceeding from the minimum value in the direction of the maximum value and, in this case, to measure the input voltage across the internal resistor of the measuring transducer. If the input voltage falls below a predefinable threshold value, which is greater than the minimum input voltage required to maintain operability, before the loop current has reached its maximum value, this state is evaluated as a fault. In the event of an identified fault, the DC loop current is reduced until the input voltage reaches at least the predefinable threshold value and a fault is thereby signaled.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE SIGNS

11, 12 current supply unit
111, 121 voltage source
112, 122 current controller/active current limiter
113, 123 reference
114, 124 measuring amplifier
2 connection circuit
21 current-limiting resistor
22 field-device connection terminal
23 voltage
3 field device
4 connection line

The invention claimed is:

1. A method for intrinsically safe redundant current supply of a field device including a common current-limiting resistor in a mesh of the field device, the method comprising:
   providing a current supply device including at least two current supply units, each current supply unit including a power-limiting unit comprising a controllable voltage source;
   connecting the field device via a connection line to one or more field-device connection terminals of the current supply device;
   measuring a voltage across the one or more field-device connection terminals, to obtain a measured voltage;
   comparing the measured voltage with a reference value; and
   reducing an output voltage, an output current, or the output voltage and output current of each current supply unit as a function of the measured voltage if the measured voltage falls below the reference value.

2. The method of claim 1, wherein the output current of each current supply unit is reduced as a function of the measured voltage to a test current which is lower than a supply current of the field device.

3. A device for intrinsically safe redundant current supply of a field device, the device comprising:
   a current supply device including at least two current supply units, each current supply unit including a power-limiting unit comprising a controllable voltage source;
   a common current-limiting resistor in a mesh of the field device; and
   a connection line,
   wherein the field device is connected via the connection line to field-device connection terminals of the current supply device, and
   wherein each power-limiting unit is configured to be adjusted using a measuring amplifier as a function of a difference between a measured voltage across the field-device connection terminals and a reference voltage.

4. The device of claim 3, wherein the power-limiting unit further comprises a current controller/active current limiter.

\* \* \* \* \*